March 11, 1969     K. SVILPE ET AL     3,432,790
ADJUSTABLE RHEOSTAT MEANS FOR LIQUID LEVEL GAUGES
Filed March 6, 1967

United States Patent Office 3,432,790
Patented Mar. 11, 1969

3,432,790
**ADJUSTABLE RHEOSTAT MEANS FOR
LIQUID LEVEL GAUGES**
Karl Yanovich Svilpe, Ul. Pernavas, 10, kv. 20; Genakh Maxovich Luft, Ul. Lachplesha 35, kv. 19; Andris Alfredovich Betiyan, Ul. Tallinas 90, kv. 9; Viktor Vasilievich Milyaev, Chiekurkalns 2, poperechnaya liniia 1–2, kv. 16; and Lieb Borukhovich Gurevich, Ul. Kuldigas 29, kv. 5, all of Riga, U.S.S.R.; and Ivan Vasilievich Seleznev, Ul. Ljublinskaya 8/1, kv. 33, Moscow, U.S.S.R.
Filed Mar. 6, 1967, Ser. No. 620,951
U.S. Cl. 338—33    2 Claims
Int. Cl. H01c 13/00

ABSTRACT OF THE DISCLOSURE

A liquid level gauge including a bent spring-type contact brush having one end rigidly secured to a pivotal axis within a housing. A float is connected to such pivotal axis in the housing and a rheostat in the housing has a winding on which the brush travels in operation. One end of the rheostat is pivoted in the housing and the other end is spring loaded and secured by a screw to the housing so that turning of the screw effects turning of the rheostat relative to the axis of the contact brush.

---

The present invention relates to telemetering electrical systems, more particularly to electrically-operated liquid level gauges capable of being employed for an indication of the fuel level in a tank of an automotive vehicle, such as a car or a tractor.

Liquid level gauges are known in which the housing accommodates a rheostat cooperating with a spring-biased contact brush. The position of the brush is controlled by a float immersed in the liquid and operatively connected to the brush by means of a pivoted arm (Cf. German Patent No. 878,114 or the book "Electrical Equipment of Automotive Vehicles," by B. M. Ilyin, Moscow, 1962, pp. 206–208). The operation of a liquid level gauge of this type is based on the assumption that a given reference level of the liquid corresponds to the certain position of the float, and, consequently, to the certain position of contact between the brush and the rheostat winding. Thus, a certain value of resistance of this winding, corresponding to the reference level of the liquid, is present in the electric circuit including a remote indicator. The spread of the resistance values of the rheostat coil at such reference points, as E (empty); 0.25; 0.5; 0.75; F (full) stages of tank filling, is due to variations in the winding wire diameter across the length of the winding variations in the specific resistance value of the wire or variations in the rheostat core diameter. Accordingly, the final adjustment of the resistance values at the reference points is carried out by bending the contact brush to vary the radial distance from the point of contact between the brush and the winding to the pivot axis of the brush, with the rheostat per se being held stationary during this adjustment.

A disadvantage of the abovedescribed known device resides in the fact that any variation in the operative radius of the contact brush leads to variations in the contact pressure of the brush against the rheostat winding, which, in turn, adversely affects the reliability of such contact. Moreover, practice demonstrates that such adjustment is neither sufficiently accurate nor dependable.

It is, therefore, a general object of the present invention to overcome the aforementioned disadvantages.

It is another object of the present invention to provide a liquid level gauge capable of simple, accurate and reliable adjustment.

It is yet another object of the present invention to provide a liquid level gauge ensuring stable and reliable contact between the contact brush and the rheostat winding.

These and other objects are attained in a liquid level gauge, in which, according to the present invention, the rheostat is mounted to pivot in a plane parallel to the plane of rotation of the contact brush, while the contact brush per se is of a resilient material having a bent shape and engages in operation an adjustable abutment by means of which the contact pressure of the brush against the rheostat winding may be controlled.

In a preferred embodiment of the present invention, a spring is interposed between the gauge housing and an end portion of the rheostat opposite to an end portion thereof pivotally mounted on the housing, with the first-mentioned end portion being connected to the housing by means of a screw, whereby upon rotation of the screw, the rheostat may be rotated about its pivot axis in a plane parallel to the plane of rotation of the contact brush.

It may be useful to make the resilient contact brush in the form of a strip of resilient material bent upon itself, with the free end of the strip engaging in operation the contact surface of an adjustable bracket. By displacing the contact surface in a plane normal to the plane of rotation of the contact brush, the contact pressure of the brush against the rheostat winding may be adjusted.

The invention may be better understood from the following detailed description of an embodiment thereof and reference is made to the accompanying drawings in which.

Figure 1:
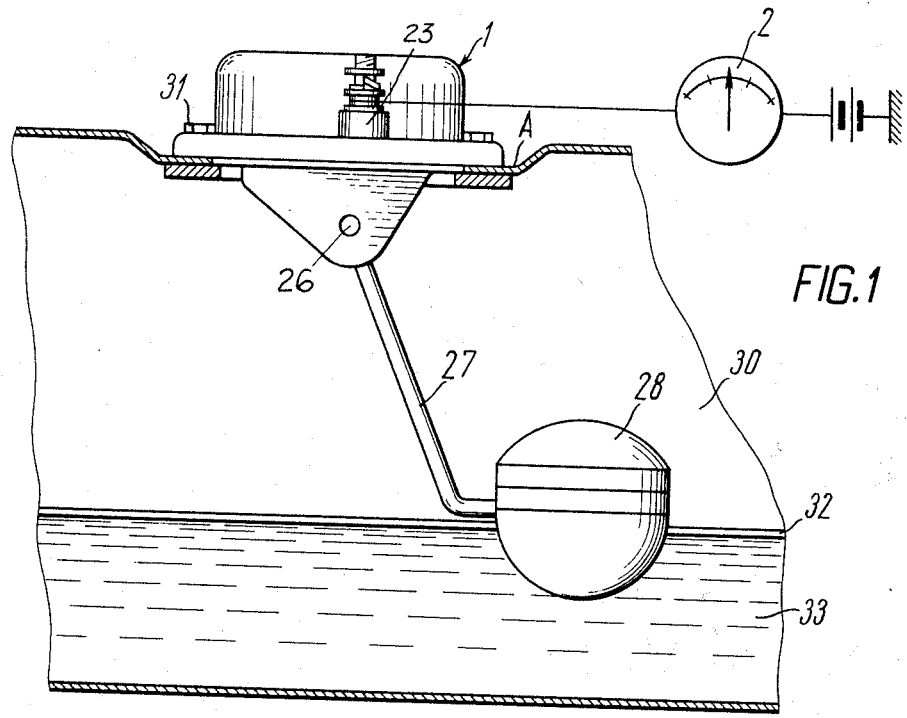
FIG. 1 is a fragmentary view partly in elevation and partly in cross section of the fuel tank of an automotive vehicle, partially filled with liquid fuel and accommodating a liquid level gauge embodying the present invention with the electric circuit connecting the gauge with a remote indicator being illustrated diagrammatically.
Figure 3:
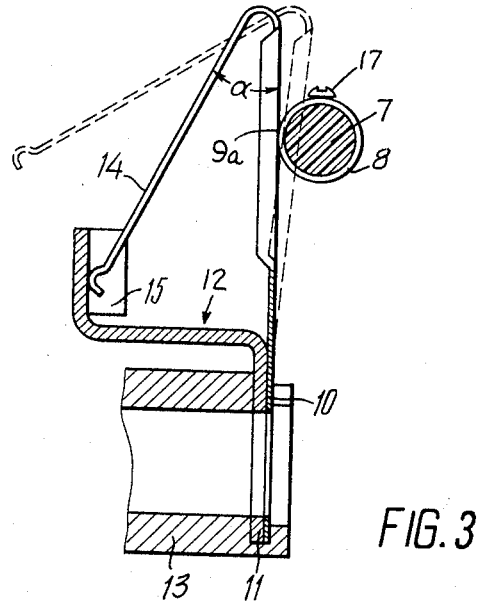
FIG. 3 is a detailed view partly in section and partly in elevation of the contact brush and the mounting means therefor.
Figure 4:
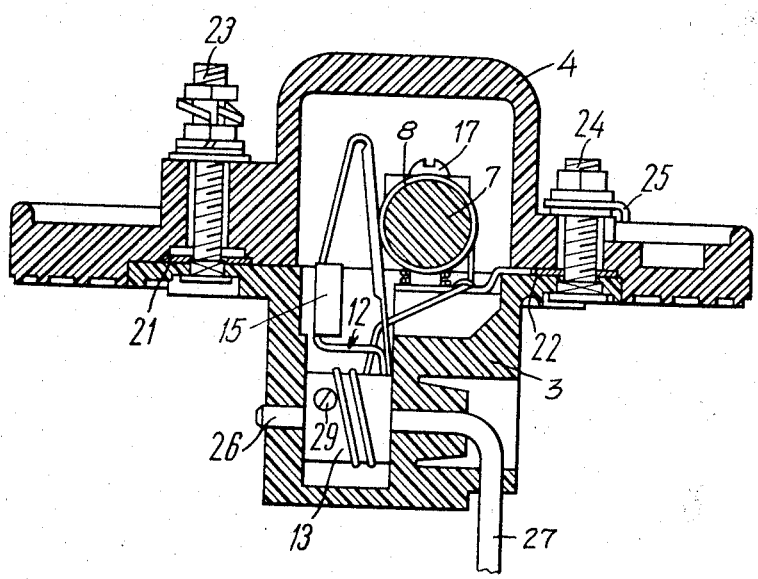
FIG. 4 is a cross-sectional view of the liquid level gauge illustrated in FIG. 1, taken in a vertical plane at right angles relative to FIG. 2.

A liquid level gauge denoted generally 1 (FIG. 1) is electrically connected to a remote indicator 2. The gauge includes a housing 3 (FIG. 2) and a lid or cover 4, with the housing and lid each being made of synthetic plastic material. Within the housing 3, an end portion 6 of a rheostat 7 is mounted on a pivot 5. The rheostat 7 is provided with a winding 8 and cooperates with a flat resilient contact brush denoted generally 9 defined by a resilient strip bent upon itself. An end portion 10 (FIG. 3) of the contact brush 9 is attached to an end portion 11 of a substantially S-shaped bracket 12 and is also secured to a sleeve 13 rotatable in the housing, while the bent end portion 14 (FIG. 3) of the brush 9 is received within a U-shaped bail 15 provided on end portion 11a the bracket 12 (FIG. 4). The end portion 14 is freely displaceable within the bail 15 in a direction normal to the plane of rotation of the brush 9, thus providing for adjustment of the contact pressure of the brush 9 against the winding 8 of the rheostat 7. Opposite end portion 16 (FIG. 2) of the rheostat 7 is connected to the housing 3 by means of a screw 17 and is biased by a spring 18 surrounding the screw and lodged between the end portion 16 and the housing. Hence, the rheostat 7 may be rotated about its axis 5 in a plane parallel to the plane of rotation of the contact brush 9.

Figure 2:
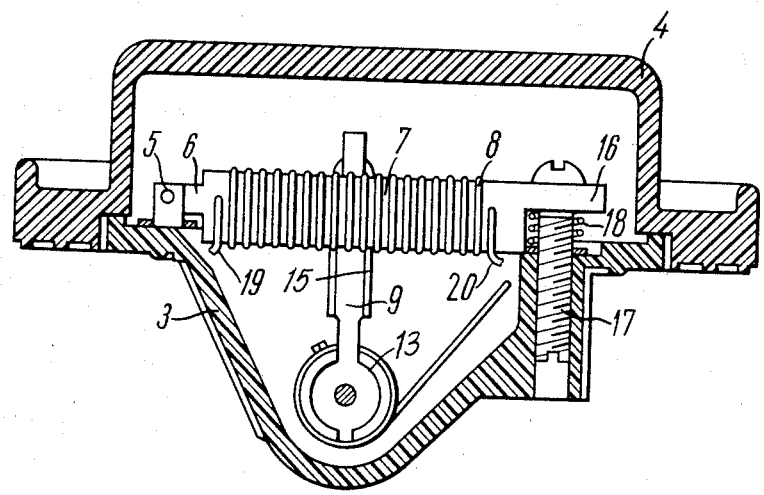
FIG. 2 is a longitudinal sectional view of the liquid level gauge shown in FIG. 1, taken in a vertical plane

Terminal leads 19 and 20 FIGURE 2 of the winding are electrically connected by metal plates 21 and 22 FIGURE 2 (FIG. 4) to contact screws 23 and 24 FIGURE 2 and the contact screws 23 and 24 are also adapted to tighten the lid 4 on the housing 3.

The gauge 1 is connected to a power supply (not shown) by means of the screw 24 and a metal plate 25. The sleeve 13 is received on an end portion 26 of an arm 27 (FIG. 1) operatively connected to a float 28 with the sleeve 13 being secured to the end portion 26 by means of a screw 29 (FIG. 4). The portion 26 is mounted for rotation in the housing 3.

The gauge 1 is housed within a specially-provided recess A of a fuel tank 30 (FIG. 1) and is attached thereto by means of a plurality of bolts 31.

As level 32 of fuel 33 in the tank 30 is raised, the float 28 is displaced upwardly from its position corresponding to an empty tank condition to the one corresponding to a full condition. As the float 28 rises, it displaces the arm 27, which, in turn, moves contact point 9a of the contact brush 9 (FIG. 2) across the winding 8, whereby the electrical resistance of the part of the winding, wired into the circuit of the remote indicator 2, is varied. Accordingly, the current flowing in the circuit varies, and the indicator 2 shows a corresponding reading.

The adjustment of the gauge for the E (or zero) position of the indicator, i.e. for a reading corresponding to an empty tank, is effected by placing the contact point 9a adjacent to the end portion 19 of the winding 8, and in which position the brush is secured by means of the screw 29. On the other hand, the adjustment of the gauge to the F (or 1.0) position of the indicator, i.e. for a reading corresponding to a full tank, is effected by pivoting the rheostat 7 by its end portion 16 with the assistance of the set screw 17 and associated spring 18. With the rheostat 7 being pivoted about the pivot axis 5, the value of its electrical resistance wired into the indicator 2 circuit may be varied within a 1 ohm to 2 ohm range without changing the position of the contact brush 9. This provides for the compensation of the spread of the resistance of the winding 8, which may be caused by variations in the thickness of the wire of the winding, or by inaccuracy in the manufacture of the winding. The contact pressure of the contact brush 9 against the winding 8 may also be adjusted within a 30 g. to 40 g. range by setting the angle $\alpha$ (FIG. 3) by bending the U-shaped bail 15 of the bracket 12 (FIG. 4).

Practical experience with gauges embodying the present invention has proved that the gauges operate normally within vehicle mileage up to 200,000 km., with their operation being characterized by high accuracy of indications and reliability.

This invention is not to be confined to any strict conformity to the showings in the drawings but changes or modifications may be made therein so long as such changes or modifications mark no material departure from the spirit and scope of the appended claims.

What is claimed is:

1. A liquid level gauge comprising a housing, a bent spring-type contact brush, a pivotal axis within the housing to which one end of the contact brush is rigidly secured, a float, arm means connecting the float to the pivotal axis, a rheostat provided with a winding on the surface of which the contact brush travels in operation, said rheostat having ends, one end of the rheostat being pivoted on an axis in the housing, means spring-loading the other end of the rheostat and a screw securing said other end in the housing so that turning of the screw effects the turning of the rheostat relative to the axis of the contact brush.

2. The liquid level gauge as claimed in claim 1 in which said contact brush is bent double and is provided with a free end, a movable adjustable U-shaped support against which said free end abuts and the contact between the brush and the rheostat winding taking place between the one end rigidly secured to the pivotal axis and the bend of the brush.

References Cited

UNITED STATES PATENTS

| 1,605,116 | 11/1926 | Kellum | 73—313 X |
| 2,266,298 | 12/1941 | Bacon | 338—33 |
| 2,624,821 | 1/1953 | McCandless | 73—313 X |
| 2,738,674 | 3/1956 | Perkins | 73—313 |
| 2,835,885 | 5/1958 | Boddy | 73—313 X |
| 2,873,305 | 2/1959 | Boddy | 338—33 X |

LOUIS R. PRINCE, *Primary Examiner.*

D. M. YASICH, *Assistant Examiner.*

U.S. Cl. X.R.

73—313; 338—165, 169